(12) United States Patent
Xu et al.

(10) Patent No.: US 8,446,683 B2
(45) Date of Patent: May 21, 2013

(54) SYSTEMS AND METHODS FOR DATA PRE-CODING CALIBRATION

(75) Inventors: Changyou Xu, Fremont, CA (US); Shaohua Yang, San Jose, CA (US); Haitoa Xia, San Jose, CA (US); Kapil Gaba, Fremont, CA (US)

(73) Assignee: LSI Corporation, San Jose, CA (US)

( * ) Notice: Subject to any disclaimer, the term of this patent is extended or adjusted under 35 U.S.C. 154(b) by 326 days.

(21) Appl. No.: 13/031,818

(22) Filed: Feb. 22, 2011

(65) Prior Publication Data

US 2012/0212849 A1    Aug. 23, 2012

(51) Int. Cl.
*G11B 5/00* (2006.01)

(52) U.S. Cl.
USPC ............. 360/32; 360/25; 360/29; 360/39; 360/40; 360/65; 714/794; 714/795

(58) Field of Classification Search ............. None
See application file for complete search history.

(56) References Cited

U.S. PATENT DOCUMENTS

| | | | |
|---|---|---|---|
| 5,140,474 A * | 8/1992 | Kahlman et al. | 360/40 |
| 5,278,703 A | 1/1994 | Rub et al. | |
| 5,278,846 A | 1/1994 | Okayama et al. | |
| 5,325,402 A | 6/1994 | Ushirokawa | |
| 5,392,299 A | 2/1995 | Rhines et al. | |
| 5,471,500 A | 11/1995 | Blaker et al. | |
| 5,513,192 A | 4/1996 | Janku et al. | |
| 5,523,903 A | 6/1996 | Hetzler et al. | |
| 5,550,870 A | 8/1996 | Blaker et al. | |
| 5,612,964 A | 3/1997 | Haraszti | |
| 5,701,314 A | 12/1997 | Armstrong et al. | |
| 5,710,784 A | 1/1998 | Kindred et al. | |
| 5,712,861 A | 1/1998 | Inoue et al. | |

(Continued)

FOREIGN PATENT DOCUMENTS

| | | |
|---|---|---|
| EP | 0522578 | 1/1993 |
| EP | 0631277 | 12/1994 |

(Continued)

OTHER PUBLICATIONS

U.S. Appl. No. 11/461,026, filed Jul. 31, 2006, Tan, Weijun.

(Continued)

*Primary Examiner* — Dismery Mercedes
(74) *Attorney, Agent, or Firm* — Hamilton DeSanctis & Cha

(57) ABSTRACT

Various embodiments of the present invention provide systems and methods for selecting between pre-coding and non-pre-coding. As an example, a data processing circuit is disclosed that includes: a first data detector circuit, a second data detector circuit, a first comparator circuit, a second comparator circuit, and a pre-code selection circuit. The first data detector circuit is selectably configurable to operate in a pre-coded state, and operable to apply a data detection algorithm on a data input to yield a first detected output. The second data detector circuit operable to apply the data detection algorithm to the data input to yield a second detected output without compensating for pre-coding. The first comparator circuit operable to compare the first detected output against a known input to yield a first comparison value, and the second comparator circuit operable to compare the second detected output against the known input to yield a second comparison value. The pre-code selection circuit is operable to determine a selectable configuration of the first data detector circuit based at least in part on the first comparison value and the second comparison value.

21 Claims, 6 Drawing Sheets

U.S. PATENT DOCUMENTS

| | | | |
|---|---|---|---|
| 5,717,706 A | 2/1998 | Ikeda | |
| 5,768,044 A | 6/1998 | Hetzler | |
| 5,802,118 A | 9/1998 | Bliss et al. | |
| 5,844,945 A | 12/1998 | Nam et al. | |
| 5,877,909 A * | 3/1999 | Ko et al. | 360/40 |
| 5,898,710 A | 4/1999 | Amrany | |
| 5,923,713 A | 7/1999 | Hatakeyama | |
| 5,978,414 A | 11/1999 | Nara | |
| 5,983,383 A | 11/1999 | Wolf | |
| 6,005,897 A | 12/1999 | McCallister et al. | |
| 6,023,783 A | 2/2000 | Divsalar et al. | |
| 6,029,264 A | 2/2000 | Kobayashi et al. | |
| 6,041,432 A | 3/2000 | Ikeda | |
| 6,065,149 A | 5/2000 | Yamanaka | |
| 6,097,764 A | 8/2000 | McCallister et al. | |
| 6,145,110 A | 11/2000 | Khayrallah | |
| 6,185,716 B1 * | 2/2001 | Riggle | 714/769 |
| 6,216,249 B1 | 4/2001 | Bliss et al. | |
| 6,216,251 B1 | 4/2001 | McGinn | |
| 6,229,467 B1 | 5/2001 | Eklund et al. | |
| 6,266,795 B1 | 7/2001 | Wei | |
| 6,317,472 B1 | 11/2001 | Choi et al. | |
| 6,351,832 B1 | 2/2002 | Wei | |
| 6,377,610 B1 | 4/2002 | Hagenauer et al. | |
| 6,381,726 B1 | 4/2002 | Weng | |
| 6,438,717 B1 | 8/2002 | Butler et al. | |
| 6,473,878 B1 | 10/2002 | Wei | |
| 6,476,989 B1 | 11/2002 | Chainer et al. | |
| 6,490,110 B2 * | 12/2002 | Reed et al. | 360/48 |
| 6,625,775 B1 | 9/2003 | Kim | |
| 6,657,803 B1 | 12/2003 | Ling et al. | |
| 6,671,404 B1 | 12/2003 | Kawatani et al. | |
| 6,724,555 B2 * | 4/2004 | Ohta | 360/65 |
| 6,748,034 B2 | 6/2004 | Hattori et al. | |
| 6,757,862 B1 | 6/2004 | Marianetti, II | |
| 6,785,863 B2 | 8/2004 | Blankenship et al. | |
| 6,788,654 B1 | 9/2004 | Hashimoto et al. | |
| 6,810,502 B2 | 10/2004 | Eidson | |
| 6,980,382 B2 | 12/2005 | Hirano et al. | |
| 6,986,098 B2 | 1/2006 | Poeppelman | |
| 7,010,051 B2 | 3/2006 | Murayama et al. | |
| 7,047,474 B2 | 5/2006 | Rhee et al. | |
| 7,058,873 B2 | 6/2006 | Song et al. | |
| 7,073,118 B2 | 7/2006 | Greeberg et al. | |
| 7,093,179 B2 | 8/2006 | Shea | |
| 7,113,356 B1 | 9/2006 | Wu | |
| 7,136,244 B1 | 11/2006 | Rothbert | |
| 7,173,783 B1 | 2/2007 | McEwen et al. | |
| 7,173,784 B2 * | 2/2007 | Cideciyan et al. | 360/46 |
| 7,184,486 B1 | 2/2007 | Wu et al. | |
| 7,191,378 B2 | 3/2007 | Eroz et al. | |
| 7,203,015 B2 | 4/2007 | Sakai et al. | |
| 7,203,887 B2 | 4/2007 | Eroz et al. | |
| 7,236,757 B2 | 6/2007 | Raghaven et al. | |
| 7,257,764 B2 | 8/2007 | Suzuki et al. | |
| 7,310,768 B2 | 12/2007 | Eidson et al. | |
| 7,313,750 B1 | 12/2007 | Feng et al. | |
| 7,370,258 B2 | 5/2008 | Iancu et al. | |
| 7,403,752 B2 | 7/2008 | Raghaven et al. | |
| 7,430,256 B2 | 9/2008 | Zhidkov | |
| 7,499,233 B1 * | 3/2009 | Han et al. | 360/65 |
| 7,502,189 B2 | 3/2009 | Sawaguchi et al. | |
| 7,505,537 B1 | 3/2009 | Sutardja | |
| 7,523,375 B2 | 4/2009 | Spencer | |
| 7,509,927 B2 | 9/2009 | Shin et al. | |
| 7,587,657 B2 | 9/2009 | Haratsch | |
| 7,590,168 B2 | 9/2009 | Raghaven et al. | |
| 7,702,989 B2 | 4/2010 | Graef et al. | |
| 7,712,008 B2 | 5/2010 | Song et al. | |
| 7,738,201 B2 | 6/2010 | Jin et al. | |
| 7,738,202 B1 * | 6/2010 | Zheng et al. | 360/46 |
| 7,752,523 B1 | 7/2010 | Chaichanavong | |
| 7,801,200 B2 | 9/2010 | Tan | |
| 7,802,163 B2 | 9/2010 | Tan | |
| 8,245,104 B2 * | 8/2012 | Yang et al. | 714/758 |
| 8,261,171 B2 * | 9/2012 | Annampedu | 714/795 |
| 2003/0063405 A1 | 4/2003 | Jin et al. | |
| 2003/0081693 A1 | 5/2003 | Raghaven et al. | |
| 2003/0087634 A1 | 5/2003 | Raghaven et al. | |
| 2003/0112896 A1 | 6/2003 | Raghaven et al. | |
| 2003/0134607 A1 | 7/2003 | Raghaven et al. | |
| 2004/0071206 A1 | 4/2004 | Takatsu | |
| 2004/0098659 A1 | 5/2004 | Bjerke et al. | |
| 2004/0237020 A1 * | 11/2004 | Eiji | 714/758 |
| 2005/0010855 A1 | 1/2005 | Lusky | |
| 2005/0078399 A1 | 4/2005 | Fung | |
| 2005/0111540 A1 | 5/2005 | Modrie et al. | |
| 2005/0157780 A1 | 7/2005 | Werner et al. | |
| 2005/0195749 A1 | 9/2005 | Elmasry et al. | |
| 2005/0216819 A1 | 9/2005 | Chugg et al. | |
| 2005/0273688 A1 | 12/2005 | Argon | |
| 2006/0020872 A1 | 1/2006 | Richardson et al. | |
| 2006/0031737 A1 | 2/2006 | Chugg et al. | |
| 2006/0123285 A1 | 6/2006 | De Araujo et al. | |
| 2006/0140311 A1 | 6/2006 | Ashley et al. | |
| 2006/0168493 A1 | 7/2006 | Song | |
| 2006/0195772 A1 | 8/2006 | Graef et al. | |
| 2006/0210002 A1 | 9/2006 | Yang et al. | |
| 2006/0248435 A1 | 11/2006 | Haratsch | |
| 2006/0256670 A1 | 11/2006 | Park et al. | |
| 2007/0011569 A1 | 1/2007 | Vila Casado et al. | |
| 2007/0047121 A1 | 3/2007 | Elefeheriou et al. | |
| 2007/0047635 A1 | 3/2007 | Stojanovic et al. | |
| 2007/0110200 A1 | 5/2007 | Mergen et al. | |
| 2007/0230407 A1 | 10/2007 | Petrie et al. | |
| 2007/0286270 A1 * | 12/2007 | Huang et al. | 375/229 |
| 2007/0297544 A1 * | 12/2007 | Choi et al. | 375/346 |
| 2008/0049825 A1 | 2/2008 | Chen et al. | |
| 2008/0055122 A1 | 3/2008 | Tan | |
| 2008/0065970 A1 | 3/2008 | Tan | |
| 2008/0069373 A1 | 3/2008 | Jiang et al. | |
| 2008/0168330 A1 | 7/2008 | Graef et al. | |
| 2008/0276156 A1 | 11/2008 | Gunnam | |
| 2008/0301521 A1 | 12/2008 | Gunnam | |
| 2009/0185643 A1 | 7/2009 | Fitzpatrick | |
| 2009/0199071 A1 | 8/2009 | Graef | |
| 2009/0235116 A1 | 9/2009 | Tan et al. | |
| 2009/0235146 A1 | 9/2009 | Tan et al. | |
| 2009/0259915 A1 | 10/2009 | Livshitz et al. | |
| 2009/0273492 A1 | 11/2009 | Yang et al. | |
| 2009/0274247 A1 | 11/2009 | Galbraith et al. | |
| 2010/0002795 A1 | 1/2010 | Raghaven et al. | |
| 2010/0042877 A1 | 2/2010 | Tan | |
| 2010/0042890 A1 | 2/2010 | Gunam | |
| 2010/0050043 A1 | 2/2010 | Savin | |
| 2010/0061492 A1 | 3/2010 | Noeldner | |
| 2010/0070837 A1 | 3/2010 | Xu et al. | |
| 2010/0164764 A1 | 7/2010 | Nayak | |
| 2010/0185914 A1 | 7/2010 | Tan et al. | |
| 2011/0075569 A1 | 3/2011 | Marrow et al. | |
| 2011/0080211 A1 | 4/2011 | Yang et al. | |
| 2011/0167246 A1 | 7/2011 | Yang et al. | |

FOREIGN PATENT DOCUMENTS

| | | |
|---|---|---|
| EP | 1814108 | 8/2007 |
| WO | WO 2006/016751 | 2/2006 |
| WO | WO 2006/134527 | 12/2006 |
| WO | WO 2007/091797 | 8/2007 |
| WO | WO 2010/126482 | 4/2010 |
| WO | WO 2010/101578 | 9/2010 |

OTHER PUBLICATIONS

U.S. Appl. No. 11/461,198, filed Jul. 31, 2006, Tan, Weijun.
U.S. Appl. No. 11/461,283, filed Jul. 31, 2006, Tan, Weijun.
U.S. Appl. No. 12/540,283, filed Aug. 12, 2009, Liu, et al.
U.S. Appl. No. 12/652,201, filed Jan. 5, 2010, Mathew, et al.
U.S. Appl. No. 12/763,050, filed Apr. 19, 2010, Ivkovic, et al.
U.S. Appl. No. 12/792,555, filed Jun. 2, 2010, Liu, et al.
U.S. Appl. No. 12/887,317, filed Sep. 21, 2010, Xia, et al.
U.S. Appl. No. 12/887,330, filed Sep. 21, 2010, Zhang, et al.
U.S. Appl. No. 12/887,369, filed Sep. 21, 2010, Liu, et al.
U.S. Appl. No. 12/901,816, filed Oct. 11, 2010, Li, et al.
U.S. Appl. No. 12/901,742, filed Oct. 11, 2010, Yang.
U.S. Appl. No. 12/917,756, filed Nov. 2, 2010, Miladinovic, et al.
U.S. Appl. No. 12/947,931, filed Nov. 17, 2010, Yang, Shaohua.

U.S. Appl. No. 12/947,947, filed Nov. 17, 2010, Ivkovic, et al.
U.S. Appl. No. 12/972,942, filed Dec. 20, 2010, Liao, et al.
U.S. Appl. No. 12/992,948, filed Nov. 16, 2010, Yang, et al.
U.S. Appl. No. 13/021,814, filed Feb. 7, 2011, Jin, Ming, et al.
U.S. Appl. No. 13/031,818, filed Feb. 22, 2011, Xu, Changyou, et al.
U.S. Appl. No. 13/050,129, filed Mar. 17, 2011, Tan, et al.
U.S. Appl. No. 13/050,765, filed Mar. 17, 2011, Yang, et al.
U.S. Appl. No. 13/088,119, filed Apr. 15, 2011, Zhang, et al.
U.S. Appl. No. 13/088,146, filed Apr. 15, 2011, Li, et al.
U.S. Appl. No. 13/088,178, filed Apr. 15, 2011, Sun, et al.
U.S. Appl. No. 13/126,748, filed Apr. 28, 2011, Tan.
U.S. Appl. No. 13/167,764, filed Jun. 24, 2011, Li, Zongwang, et al.
U.S. Appl. No. 13/167,771, filed Jun. 24, 2011, Li, Zongwang, et al.
U.S. Appl. No. 13/167,775, filed Jun. 24, 2011, Li, Zongwang.
U.S. Appl. No. 13/186,146, filed Jul. 19, 2011, Mathew, et al.
U.S. Appl. No. 13/186,213, filed Jul. 19, 2011, Mathew, et al.
U.S. Appl. No. 13/186,234, filed Jul. 19, 2011, Xia, Haitao, et al.
U.S. Appl. No. 13/186,251, filed Jul. 19, 2011, Xia, Haitao, et al.
U.S. Appl. No. 13/186,174, filed Jul. 19, 2011, Mathew, et al.
U.S. Appl. No. 13/186,197, filed Jul. 19, 2011, Mathew, George et al.
U.S. Appl. No. 13/213,751, filed Aug. 19, 2011, Zhang, Fan, et al.
U.S. Appl. No. 13/213,808, filed Aug. 19, 2011, Jin, Ming.
U.S. Appl. No. 13/220,142, filed Aug. 29, 2011, Chang, Wu, et al.
U.S. Appl. No. 13/227,538, filed Sep. 8, 2011, Yang, Shaohua, et al.
U.S. Appl. No. 13/227,544, filed Sep. 8, 2011, Yang, Shaohua, et al.
U.S. Appl. No. 13/239,683, filed Sep. 22, 2011, Xu, Changyou.
U.S. Appl. No. 13/239,719, filed Sep. 22, 2011, Xia, Haitao, et al.
U.S. Appl. No. 13/251,342, filed Oct. 2, 2011, Xia, Haitao, et al.
U.S. Appl. No. 13/269,832, filed Oct. 10, 2011, Xia, Haitao, et al.
U.S. Appl. No. 13/269,852, filed Oct. 10, 2011, Xia, Haitao, et al.
U.S. Appl. No. 13/284,819, filed Oct. 28, 2011, Tan, Weijun, et al.
U.S. Appl. No. 13/284,730, filed Oct. 28, 2011, Zhang, Fan, et al.
U.S. Appl. No. 13/284,754, filed Oct. 28, 2011, Zhang, Fan, et al.
U.S. Appl. No. 13/284,767, filed Oct. 28, 2011, Zhang, Fan, et al.
U.S. Appl. No. 13/284,826, filed Oct. 28, 2011, Tan, Weijun, et al.
U.S. Appl. No. 13/295,150, filed Nov. 14, 2011, Li, Zongwang, et al.
U.S. Appl. No. 13/295,160, filed Nov. 14, 2011, Li, Zongwang, et al.
U.S. Appl. No. 13/251,340, filed Oct. 3, 2011, Xia, Haitao, et al.
Amer et al "Design Issues for a Shingled Write Disk System" MSST IEEE 26th Symposium May 2010.
Bahl, et al "Optimal decoding of linear codes for Minimizing symbol error rate", IEEE Trans. Inform. Theory, vol. 20, pp. 284-287, Mar. 1974.
Casado et al., Multiple-rate low-denstiy parity-check codes with constant blocklength, IEEE Transations on communications, Jan. 2009, vol. 57, pp. 75-83.
Collins and Hizlan, "Determinate State Convolutional Codes" IEEE Transactions on Communications, Dec. 1993.
Eleftheriou, E. et al., "Low Density Parity-Check Codes for Digital Subscriber Lines", Proc ICC 2002, pp. 1752-1757.
Fisher, R et al., "Adaptive Thresholding"[online] 2003 [retrieved on May 28, 2010] Retrieved from the Internet <URL:http://homepages. inf.ed.ac.uk/rbf/HIPR2/adpthrsh.htm.
Fossnorier, Marc P.C. "Quasi-Cyclic Low-Density Parity-Check Codes From Circulant Permutation Maricies" IEEE Transactions on Information Theory, vol. 50, No. 8 Aug. 8, 2004.
Gibson et al "Directions for Shingled-Write and Two-Dimensional Magnetic Recording System" Architectures: Synergies with Solid-State Disks Carnegie Mellon Univ. May 1, 2009.
K. Gunnam et al., "Next Generation iterative LDPC solutions for magnetic recording storage", invited paper. The Asilomar Conference on Signals, Systems, and Computers, Nov. 2008.
K. Gunnam et al., "Value-Reuse Properties of Min-Sum for GF(q)" (dated Oct. 2006) Dept. of ECE, Texas A&M University Technical Note, published about Aug. 2010.
K. Gunnam et al., "Value-Reuse Properties of Min-Sum for GF(q)"(dated Jul. 2008) Dept. of ECE, Texas A&M University Technical Note, published about Aug. 2010.
K. Gunnam "Area and Energy Efficient VLSI Architectures for Low-Density Parity-Check Decoders Using an On-The-Fly Computation" dissertation at Texas A&M University, Dec. 2006.
Han and Ryan, "Pinning Techniques for Low-Floor Detection/Decoding of LDPC-Coded Partial Response Channels", 5th International Symposium on Turbo Codes &Related Topics, 2008.

Hagenauer, J. et al A Viterbi Algorithm with Soft-Decision Outputs and its Applications in Proc. IEEE Globecom, pp. 47. 11-47 Dallas, TX Nov. 1989.
Lee et al., "Partial Zero-Forcing Adaptive MMSE Receiver for DS-CDMA Uplink in Multicell Environments" IEEE Transactions on Vehicular Tech. vol. 51, No. 5, Sep. 2002.
Lin et al "An efficient VLSI Architecture for non binary LDPC decoders"—IEEE Transaction on Circuits and Systems II vol. 57, Issue 1 (Jan. 2010) pp. 51-55.
Mohsenin et al., "Split Row: A Reduced Complexity, High Throughput LDPC Decoder Architecture", pp. 1-6, printed from www.ece. ucdavis.edu on Jul. 9, 2007.
Moon et al, "Pattern-dependent noise prediction in signal-dependent Noise," IEEE JSAC, vol. 19, No. 4 pp. 730-743, Apr. 2001.
Perisa et al "Frequency Offset Estimation Based on Phase Offsets Between Sample Correlations" Dept. of Info. Tech. University of Ulm 2005.
Sari H et al., "Transmission Techniques for Digital Terrestrial TV Broadcasting" IEEE Communications Magazine, IEEE Service Center NY, NY vol. 33, No. 2 Feb 1995.
Selvarathinam, A.: "Low Density Parity-Check Decoder Architecture for High Throughput Optical Fiber Channels" IEEE International Conference on Computer Design (ICCD '03) 2003.
Shu Lin, Ryan, "Channel Codes, Classical and Modern" 2009, Cambridge University Press, pp. 213-222.
Unknown, "Auto threshold and Auto Local Threshold" [online] [retrieved May 28, 2010] Retrieved from the Internet: <URL:http:// www.dentristy.bham.ac.uk/landinig/software/autoth.
Vasic, B., "High-Rate Low-Density Parity-Check Codes Based on Anti-Pasch Affine Geometries," Proc ICC 2002, pp. 1332-1336.
Vasic, B., "High-Rate Girth-Eight Codes on Rectangular Integer Lattices", IEEE Trans. Communications, vol. 52, Aug. 2004, pp. 1248-1252.
Wang Y et al., "A Soft Decision Decoding Scheme for Wireless COFDM With Application to DVB-T" IEEE Trans. on Consumer elec., IEEE Service Center, NY,NY vo. 50, No. 1 Feb. 2004.
Weon-Cheol Lee et al., "Vitierbi Decoding Method Using Channel State Info. in COFDM System" IEEE Trans. on Consumer Elect., IEEE Service Center, NY, NY vol. 45, No. 3 Aug. 1999.
Xia et al, "A Chase-GMD algorithm of Reed-Solomon codes on perpendicular channels", IEEE Transactions on Magnetics, vol. 42 pp. 2603-2605, Oct. 2006.
Xia et al, "Reliability-based Reed-Solomon decoding for magnetic recording channels", IEEE International Conference on Communication pp. 1977-1981, May 2008.
Yeo et al., "VLSI Architecture for Iterative Decoders in Magnetic Storage Channels", Mar. 2001, pp. 748-755, IEEE trans. Magnetics, vol. 37, No. 2.
Youn, et al. "BER Perform. Due to Irrreg. of Row-Weight Distrib. of the Parity-Chk. Matirx in Irreg. LDPC Codes for 10-Gb/s Opt. Signls" Jrnl of Lightwave Tech., vol. 23, Sep. 2005.
Zhong et al., "Area-Efficient Min-Sum Decoder VLSI Architecture for High-Rate QC-LDPC Codes in Magnetic Recording", pp. 1-15, Submitted 2006, not yet published.
Zhong, "Block-LDPC: A Practical LDPC Coding System Design Approach", IEEE Trans. on Circuits, Regular Papers, vol. 5, No. 4, pp. 766-775, Apr. 2005.
Zhong et al., "Design of VLSI Implementation-Oriented LDPC Codes", IEEE, pp. 670-673, 2003.
Zhong et al., "High-Rate Quasi-Cyclic LDPC Codes for Magnetic Recording Channel with Low Error Floor", ISCAS, IEEE pp. 3546-3549, May 2006.
Zhong et al., "Iterative MAX-LOG-MAP and LDPC Detector/Decoder Hardware Implementation for Magnetic Read Channel", SRC TECHRON, pp. 1-4, Oct. 2005.
Zhong et al., "Joint Code-Encoder Design for LDPC Coding System VLSI Implementation", ISCAS, IEEE pp. 389-392, May 2004.
Zhong et al., "Quasi Cyclic LDPC Codes for the Magnetic Recording Channel: Code Design and VSLI Implementation", IEEE Transactions on Magnetics, v. 43, pp. 1118-1123, Mar. 2007.
Zhong, "VLSI Architecture of LDPC Based Signal Detection and Coding System for Magnetic Recording Channel", Thesis, RPI, Troy, NY, pp. 1-95, May 2006.

* cited by examiner

US 8,446,683 B2

SYSTEMS AND METHODS FOR DATA PRE-CODING CALIBRATION

BACKGROUND OF THE INVENTION

The present inventions are related to systems and methods for data processing, and more particularly to systems and methods for adjusting a data processing system.

Various circuits have been developed that provide for accessing data from a storage medium. As an example, a disk drive system typically includes a head that is positioned in relation to data on a storage medium to allow for sensing the information maintained on the storage medium. The data is sent to a read channel device that attempts to recover the data originally written to the storage medium. In some cases, data is pre-coded as part of the data recovery process. Such pre-coding includes performing a 1/(1⊕D) operation before writing the channel bits and a (1⊕D) operation the detection of the channel bits. In some cases, such pre-coding enhances the data recovery process, but in others there is not an advantage. For example, compensating for the pre-coding in the read channel enhances data recovery in situations where there is a high channel bit density and high jitter, and where there are a number of errors associated with Nyquist error events. There is substantial overhead involved in determining whether pre-coding is selected or not. Such overhead in some cases undermines the advantages of such pre-coding.

Hence, for at least the aforementioned reasons, there exists a need in the art for advanced systems and methods for determining pre-coding in a data channel.

BRIEF SUMMARY OF THE INVENTION

The present inventions are related to systems and methods for data processing, and more particularly to systems and methods for adjusting a data processing system.

Various embodiments of the present invention provide data processing circuits that include a first data detector circuit, a second data detector circuit, a first comparator circuit, a second comparator circuit, and a pre-code selection circuit. The first data detector circuit is selectably configurable to operate in a pre-coded state, and operable to apply a data detection algorithm on a data input to yield a first detected output. The second data detector circuit operable to apply the data detection algorithm to the data input to yield a second detected output without compensating for pre-coding. The first comparator circuit operable to compare the first detected output against a known input to yield a first comparison value, and the second comparator circuit operable to compare the second detected output against the known input to yield a second comparison value. The pre-code selection circuit is operable to determine a selectable configuration of the first data detector circuit based at least in part on the first comparison value and the second comparison value.

In some instances of the aforementioned embodiments, the first data detector circuit is configurable to operate in either a pre-coded state or a non-pre-coded state. When in the pre-coded state, the first data detector circuit includes compensating for pre-coding in addition to applying the data detection algorithm. In some such cases, compensating for pre-coding includes applying a (1⊕D) function to the data input. The non-pre-coded state includes applying the data detection algorithm without compensating for pre-coding.

In various instances of the aforementioned embodiments, the circuits further include a data decoder circuit operable to apply a decoding algorithm to the first detected output to yield a decoded output, and a selector circuit operable to select application of the decoded output to the second data detector circuit. In such instances, the decoded output guides the data detection algorithm applied by the second data detector circuit.

In particular instances of the aforementioned embodiments, the pre-code selection circuit includes: a third comparator circuit operable to compare the first comparison value with the second comparison value to yield a difference output; an accumulator circuit operable to increment an accumulated output each time the first comparison value is greater than the second comparison value; and a fourth comparator circuit operable to compare the accumulated output with a threshold value to yield a value indicating the selectable configuration. In other instances of the aforementioned embodiments, the pre-code selection circuit includes: a first accumulator circuit operable to increment a first accumulated output each time the first comparison value indicates that the first detected output is different from the known data set; a second accumulator circuit operable to increment a second accumulated output each time the second comparison value indicates that the second detected output is different from the known data set; and a third comparator circuit operable to compare the first accumulated output with the second accumulated output to yield a value indicating the selectable configuration.

Other embodiments of the present invention provide methods for calibrating a data processing circuit. The methods include: providing a first data detector circuit and a second data detector circuit; configuring the first data detector circuit to perform a data detection algorithm including pre-coded compensation on a received data set to yield a first detected output; configuring the second data detector circuit to perform the data detection algorithm without pre-coded compensation on a received data set to yield a second detected output; and selecting between a pre-coded state and a non-pre-coded state based at least in part on the first detected output and the second detected output.

In some instances of the aforementioned embodiments, selecting between the pre-coded state and a non-pre-coded state includes: comparing the first detected output with a known data set to yield a first comparison value; and comparing the second detected output with the known data set to yield a second comparison value. In such instances, selecting between a pre-coded state and a non-pre-coded state is based at least in part on the first comparison value and the second comparison value. In some cases, selecting between the pre-coded state and a non-pre-coded state further includes: averaging a plurality of first comparison values to yield a first average value; averaging a plurality of second comparison values to yield second average value; and comparing the first average with the second average to yield an indication of the pre-coded state and the non-pre-coded state. In other cases, selecting between the pre-coded state and a non-pre-coded state further includes: incrementing a first accumulated value each time the first comparison value indicates that the first detected output is different from the known data set; incrementing a second accumulated value each time the second comparison value indicates that the second detected output is different from the known data set; and comparing the first accumulated value with the second accumulated value to yield indication of the pre-coded state and the non-pre-coded state.

This summary provides only a general outline of some embodiments of the invention. Many other objects, features, advantages and other embodiments of the invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF THE INVENTION

The present inventions are related to systems and methods for data processing, and more particularly to systems and methods for adjusting a data processing system.

Figure 1:
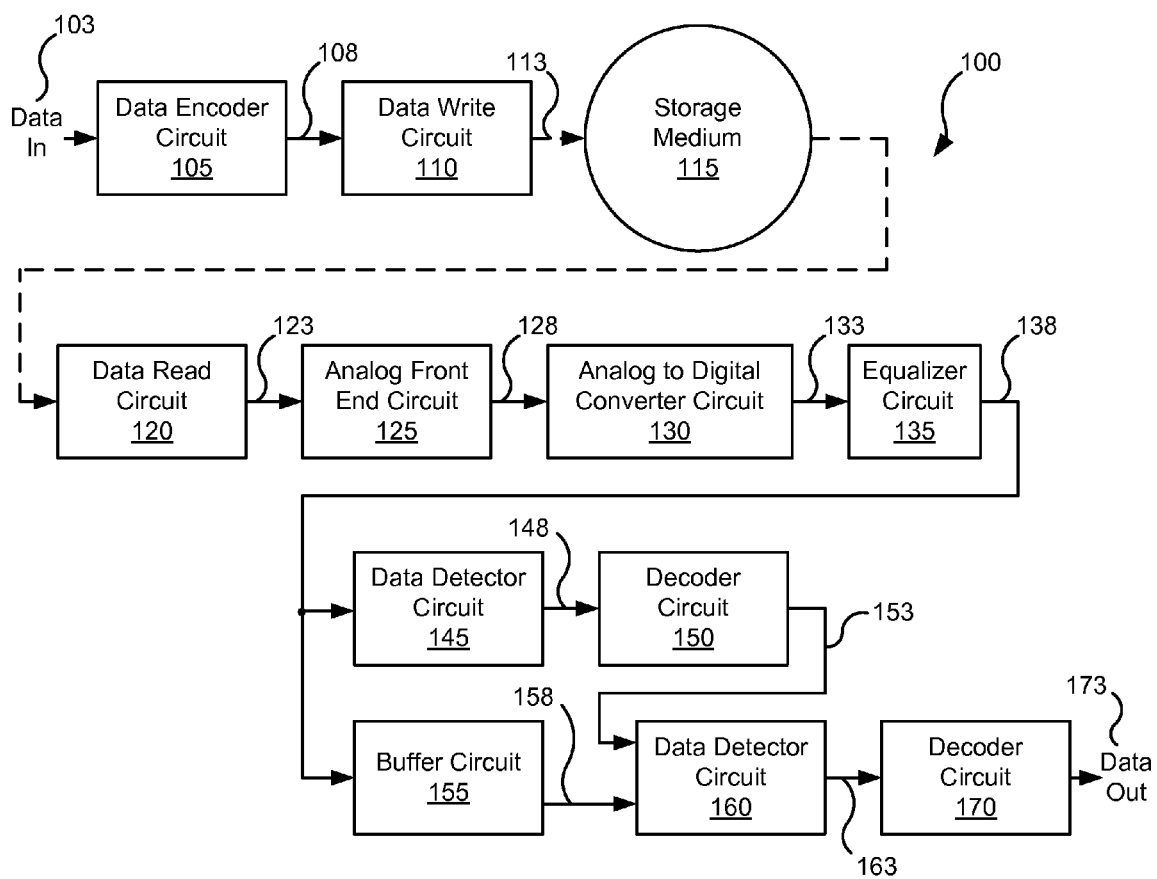
FIG. 1 depicts a prior art data processing system.

Turning to FIG. 1, a prior art data processing system 100 is shown. Data processing system 100 includes a data encoder circuit 105 that encodes a data input 103 and provides an encoded output 108. Encoded output 108 is provided to a data write circuit 110 that writes the encoded data to a storage medium 115. A data read circuit 120 senses information from storage medium 115, and provides a corresponding electrical signal 123 to an analog front end circuit 125. Analog front end circuit 125 provides a corresponding analog signal 128 to an analog to digital converter circuit 130. Analog to digital converter circuit 130 converts analog signal 128 to a series of digital samples.

Digital samples 133 are equalized by an equalizer circuit 138 to yield an equalized output 138. Equalized output 138 is provided to a data detector circuit 145 and a buffer circuit 155. Data detector circuit 145 applies a data detection algorithm to equalized output 138 to yield a detected output 148 to a data decoder circuit 150. Data decoder circuit 150 applies a data decoding algorithm to detected output 148 to yield a decoded output 153. The data from buffer circuit 155 is provided as a delayed output 158 to a data detector circuit 160. Data detector circuit 160 applies the data detection algorithm to delayed output 158 using the soft data generated by data decoder circuit 150 and provided as part of decoded output 153. Data detector circuit 160 yields a detected output 163 to a decoder circuit 170. Data decoder circuit 170 applies the data decoding algorithm to detected output 163 to yield a data output 173.

It should be noted that a variety of data processing circuits exist in the art. The preceding includes two detector circuits and two decoder circuits in series. In such an example, the two detection processes and the two decoding processes are always performed. As another example, a queue based data processing circuit is disclosed in U.S. patent application Ser. No. 12/114,462 entitled "Systems and Methods for Queue Based Data Detection and Decoding" and filed May 2, 2008 by Yang et al. The entirety of the aforementioned application is incorporated herein by reference for all purposes.

Figure 2:
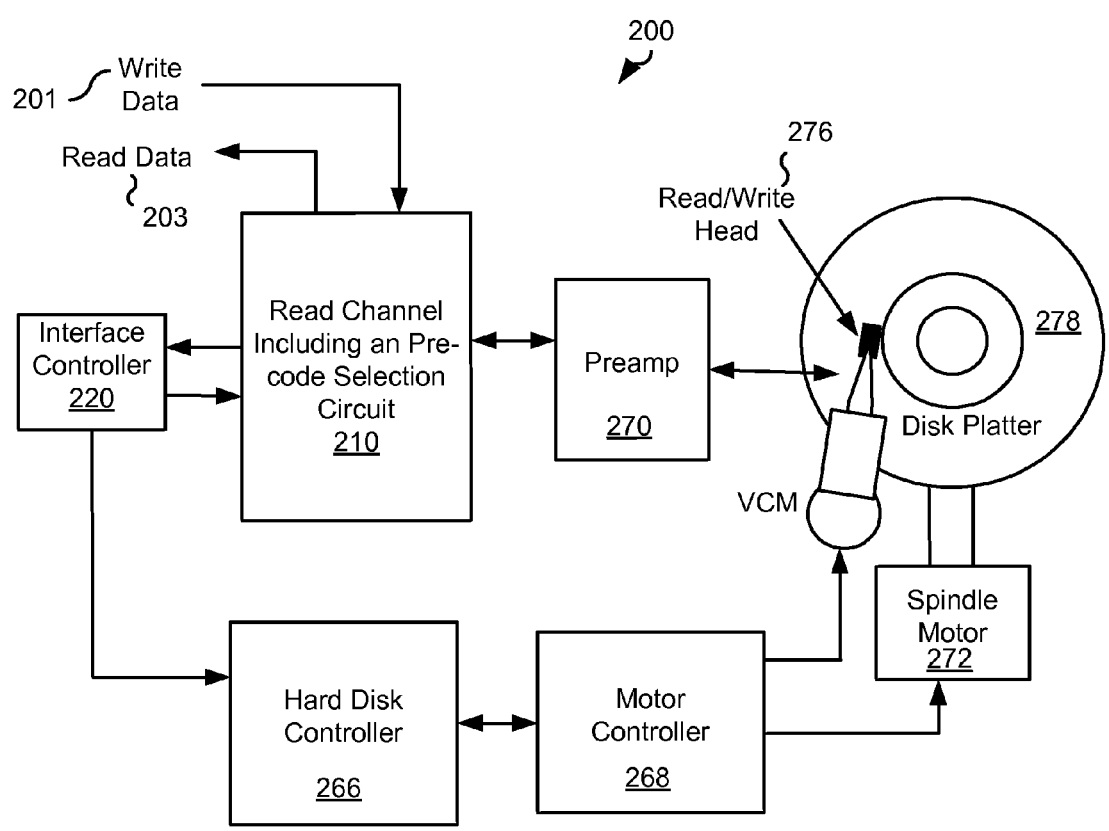
FIG. 2 shows a storage system including a read channel with a pre-code selection circuit in accordance with one or more embodiments of the present invention.

Turning to FIG. 2, a storage system 200 including a read channel circuit 210 with a pre-code selection circuit is shown in accordance with various embodiments of the present invention. Storage system 200 may be, for example, a hard disk drive. Storage system 200 also includes a preamplifier 270, an interface controller 220, a hard disk controller 266, a motor controller 268, a spindle motor 272, a disk platter 278, and a read/write head 276. Interface controller 220 controls addressing and timing of data to/from disk platter 278. The data on disk platter 278 consists of groups of magnetic signals that may be detected by read/write head assembly 276 when the assembly is properly positioned over disk platter 278. In one embodiment, disk platter 278 includes magnetic signals recorded in accordance with either a longitudinal or a perpendicular recording scheme.

In a typical read operation, read/write head assembly 276 is accurately positioned by motor controller 268 over a desired data track on disk platter 278. Motor controller 268 both positions read/write head assembly 276 in relation to disk platter 278 and drives spindle motor 272 by moving read/write head assembly to the proper data track on disk platter 278 under the direction of hard disk controller 266. Spindle motor 272 spins disk platter 278 at a determined spin rate (RPMs). Once read/write head assembly 278 is positioned adjacent the proper data track, magnetic signals representing data on disk platter 278 are sensed by read/write head assembly 276 as disk platter 278 is rotated by spindle motor 272. The sensed magnetic signals are provided as a continuous, minute analog signal representative of the magnetic data on disk platter 278. This minute analog signal is transferred from read/write head assembly 276 to read channel circuit 210 via preamplifier 270. Preamplifier 270 is operable to amplify the minute analog signals accessed from disk platter 278. In turn, read channel circuit 210 decodes and digitizes the received analog signal to recreate the information originally written to disk platter 278. This data is provided as read data 203 to a receiving circuit. A write operation is substantially the opposite of the preceding read operation with write data 201 being provided to read channel circuit 210. This data is then encoded and written to disk platter 278.

read channel circuit 210 includes a pre-code selection circuit that is able to select between use of pre-coded data and non-pre-coded data depending upon the results of a calibration scheme. Where pre-coded data is selected, the circuit responsible for writing data to disk platter 278 applies pre-coding (e.g., to apply $1/(1 \oplus D)$) operation to the written data), and the data detector circuits used for recovering the data are configured to account for the pre-coding (e.g., to apply $(1 \oplus D)$ operation to the received data). Alternatively, where non-pre-coded data is selected, the circuit responsible for writing data to disk platter 278 writes the data without pre-coding, and the data detector circuits used for recovering the data are configured to operate on non-pre-coded data. The pre-code selection circuit may be implemented similar to that discussed in relation to FIG. 3 or FIG. 5 below, and/or may operate consistent with the method discussed in relation to FIG. 4 and FIG. 6 below.

It should be noted that storage system 200 may be integrated into a larger storage system such as, for example, a RAID (redundant array of inexpensive disks or redundant array of independent disks) based storage system. It should also be noted that various functions or blocks of storage system 200 may be implemented in either software or firmware, while other functions or blocks are implemented in hardware.

Figure 3:
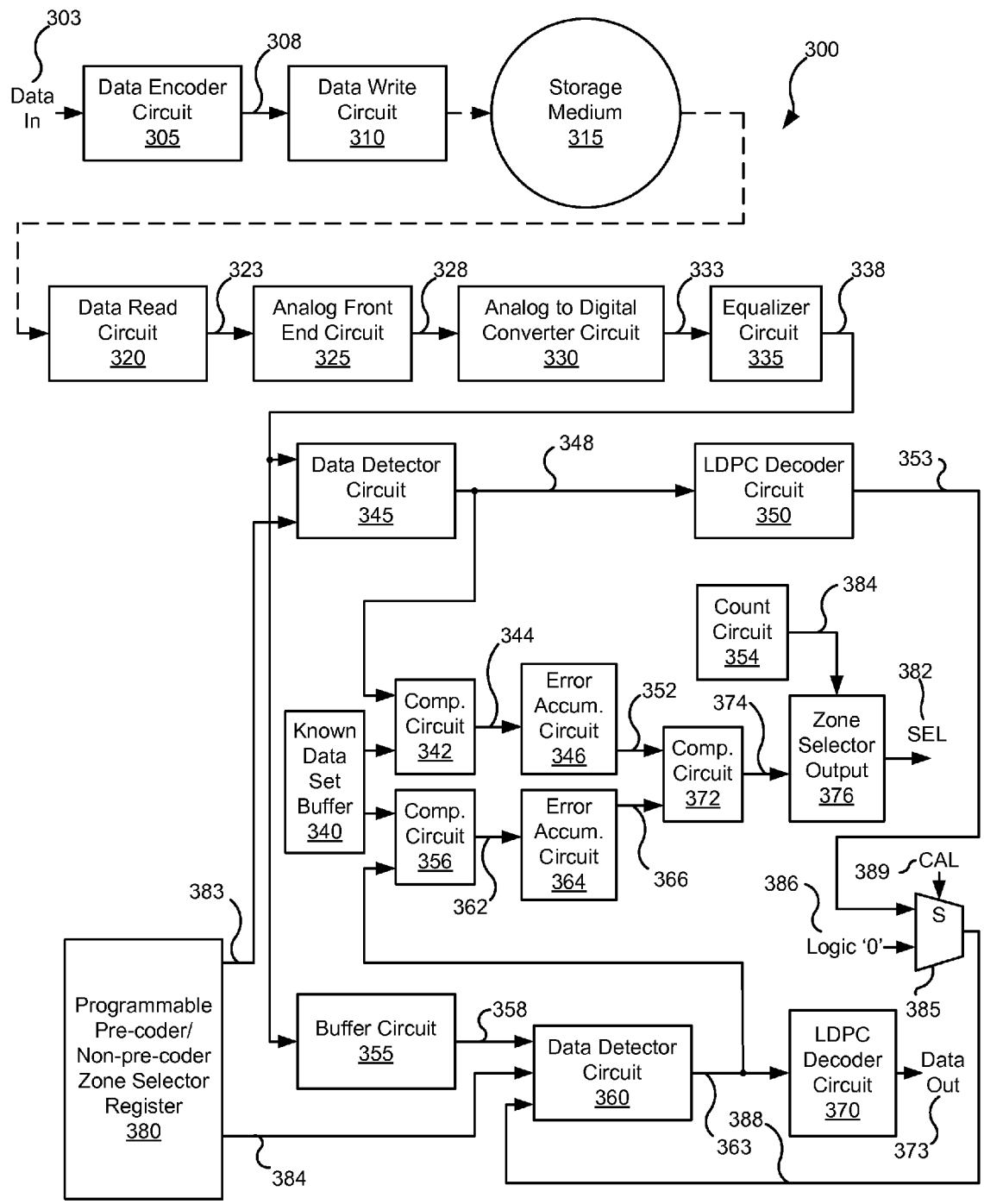
FIG. 3 depicts a pre-code selectable data processing circuit in accordance with some embodiments of the present invention.

Turning to FIG. 3, a pre-code selectable data processing circuit 300 is shown in accordance with some embodiments of the present invention. Pre-code selectable data processing circuit 300 may be configured to operate in a calibration mode or a standard mode based upon an assertion level of a CAL input 389 to a selector input 385. When CAL input 389 is asserted to select a calibration mode, a logic '0' data set 386 is provided as an output 388 from multiplexer 385. In such a situation, a data detector circuit 360 operates on a received data set independent of a data detector circuit 345. In contrast, when CAL input 389 is asserted to select a standard mode, a decoded output 353 is provided as an output 388 from multiplexer 385. In such a situation, data detector circuit 360 operates on data derived from an output of data detector circuit 345.

Pre-code selectable data processing circuit 300 includes a data encoder circuit 305 that encodes a data input 303 and provides an encoded output 308. Data encoder circuit 305 may be any circuit known in the art that is capable of encoding a received data set. In some embodiments of the present invention, data encoder circuit 305 is a low density parity check circuit as are known in the art. Based upon the disclosure provided herein, one of ordinary skill in the art will recognize a variety of encoder circuits that may be used in relation to different embodiments of the present invention. Encoded output 308 is provided to a data write circuit 310. In some cases, data write circuit 310 selectably applies pre-coding to the data (e.g., apply 1/(1⊕D)). Data write circuit 310 may be any circuit known in the art that is capable of converting a data set to information that may be maintained on a storage medium 315. Based upon the disclosure provided herein, one of ordinary skill in the art will recognize a variety of data write circuits that may be used in relation to different embodiments of the present invention. In some embodiments of the present invention, storage medium 315 is a magnetic storage medium.

A data read circuit 320 senses information from storage medium 315, and provides a corresponding electrical signal 323 to an analog front end circuit 325. Data read circuit 320 may be any circuit known in the art that is capable of sensing information from storage medium 315. This circuit may include, for example, a read/write head assembly as are known in the art. Based upon the disclosure provided herein, one of ordinary skill in the art will recognize a variety of data read circuits that may be used in relation to different embodiments of the present invention.

Electrical signal 323 is processed by analog front end circuit 325 to yield a modified signal 328. Analog front end circuit 325 may be any analog processing circuit known in the art. In one particular embodiment of the present invention, analog front end circuit 325 includes an amplifier circuit and a continuous time filter (i.e., an analog filter) that operate to amplify and noise filter the received input to yield modified signal 328. An analog to digital converter circuit 330 converts modified signal 328 into a series of digital samples 333. Analog to digital converter circuit 330 may be any circuit known in the art that is capable of providing a series of digital samples that correspond to a received analog input. Digital samples 333 are provided to an equalizer circuit 335 that yields a corresponding equalized output 338.

Equalized output 338 is provided to a data detector circuit 345 and a buffer circuit 355. Data detector circuit 345 applies a data detection algorithm to equalized output 338 to yield a detected output 348 to a data decoder circuit 350. Data detector circuit 345 may apply any data detection algorithm known in the art. In one particular embodiment of the present invention, data detector circuit 345 is a Viterbi algorithm data detector circuit as are known in the art. In another embodiment of the present invention, data detector circuit 345 is a maximum a posteriori data detector circuit as are known in the art. Based upon the disclosure provided herein, one of ordinary skill in the art will recognize other data detector circuits that may be used in relation to different embodiments of the present invention.

Data decoder circuit 350 applies a decoder algorithm to detected output 348 to yield decoded output 353. In some embodiments of the present invention, data decoder circuit 350 is a low density parity check decoder circuit as are known in the art. Based upon the disclosure provided herein, one of ordinary skill in the art will recognize various decoder circuits that may be used in relation to different embodiments of the present invention.

A buffered data set 358 is provided from buffer circuit 355 to a data detector circuit 360. Buffered data set 358 is equalized output 338 delayed in time by passing through buffer circuit 355. Data detector circuit 360 applies a data detection algorithm to buffered data set 358 to yield a detected output 363 to a data decoder circuit 370. Data detector circuit 360 may apply any data detection algorithm known in the art. In one particular embodiment of the present invention, data detector circuit 360 is a Viterbi algorithm data detector circuit as are known in the art. In another embodiment of the present invention, data detector circuit 360 is a maximum a posteriori data detector circuit as are known in the art. Based upon the disclosure provided herein, one of ordinary skill in the art will recognize other data detector circuits that may be used in relation to different embodiments of the present invention.

Data decoder circuit 370 applies a decoder algorithm to detected output 363 to yield decoded output 373. In some embodiments of the present invention, data decoder circuit 370 is a low density parity check decoder circuit as are known in the art. Based upon the disclosure provided herein, one of ordinary skill in the art will recognize various decoder circuits that may be used in relation to different embodiments of the present invention.

Data detector circuit 345 may be configured to compensate for pre-coding (e.g., apply (1⊕D)), or to operate as if pre-coding was not applied depending upon an assertion level of a selector input 383. Selector input 383 may be programmed by writing to a programmable pre-coder/non-pre-coder zone selector register 380, and is selectable from one region to another region on storage medium 315. Providing for selection of pre-coding/non-pre-coding on a zone by zone basis allows for using pre-coding where it provides an advantage, and does not require pre-coding during other regions. Programmable pre-coder/non-pre-coder zone selector register 380 is written using a value of a SEL output 382 generated during a calibration phase. Similarly, data detector circuit 360 may be configured to compensate for pre-coding (e.g., apply (1⊕D)), or to operate as if pre-coding was not applied depending upon an assertion level of a selector input 384. Selector input 384 may be programmed by writing to programmable pre-coder/non-pre-coder zone selector register 380, and is selectable from one region to another region on storage medium 315. Providing for selection of pre-coding/non-pre-coding on a zone by zone basis allows for using pre-coding where it provides an advantage, and does not require pre-coding during other regions. Programmable pre-coder/non-pre-coder zone selector register 380 is written using a value of a SEL output 382 generated during a calibration phase. During standard operation of pre-code selectable data processing circuit 300, selector input 383 and selector input 384 are the same values drawn from the same programmed value. During calibration operation of pre-code selectable data processing circuit 300, selector input 383 operates to configure data detector circuit 345 is a pre-code mode and selector input 384 operates to configure data detector circuit 360 in a non-pre-code mode.

When in the standard operational mode, CAL input 389 is asserted to select decoded output 353 that is provided as an output 388 to data detector circuit 360. In this situation, data detector circuit 360 uses the soft output portion of decoded output 353 to guide the data detection on equalized output 338 delayed and provided as buffered data set 358. In this mode, the result of output SEL 382 is not utilized.

When in the calibration mode, CAL input 389 is asserted to select the logic '0' input 386 that is provided as output 388 to data detector circuit 360. In this situation, both data detector circuit 345 and data detector circuit 360 operate on equalized output 338 in effect independently as the soft data from decoded output 353 is not made available to data detector circuit 360. In this mode of operation, selector input 383 is asserted to cause data detector circuit 345 to account for pre-coding and selector input 384 is asserted to cause data detector circuit 360 to operate without accounting for pre-coding. SEL output 382 is written back to programmable pre-coder/non-pre-coder zone selector register 380 to select either pre-coding or non-pre-coding for the given zone during standard operation.

Detected output 348 is provided to a comparator circuit 342 where it is compared with a known data from a known data set buffer 340. The known data set is the same data set that was written to storage medium 315. In the calibration mode, the known data set is read from storage medium to yield equalizer output 338, and pulled from known data set buffer 340. Comparator circuit 342 yields an error output 344 which is a bit by bit error value indicating a difference between detected output 348 provided using data detector circuit 345 applying a pre-coding compensation. Similarly, detected output 363 is provided to a comparator circuit 356 where it is compared with the same known data from known data set buffer 340. Comparator circuit 356 yields an error output 362 which is a bit by bit error value indicating a difference between detected output 363 provided using data detector circuit 360 that is not configured to apply pre-coding compensation. Error accumulator circuits 346, 364 count up the number of errors identified by the comparison between the known data and the respective detected outputs 348, 363. A comparator circuit 372 compares the number of errors identified in detected output 348 represented by an output 352 with the number of errors identified in detected output 363 represented by an output 366. Comparator circuit 372 provides a relative error result 374 to a zone selector output circuit 376. Once a sufficient amount of data has been processed as indicated by a count value 384 from a count circuit 354, zone selector output circuit 376 writes the value of SEL output 382 to programmable pre-coder/non-pre-coder zone selector register 380. In some cases, calibration is performed across several thousand bits of data before the value of SEL output 382 is written to programmable pre-coder/non-pre-coder zone selector register 380. The value of SEL output 382 is asserted to cause the use of pre-coding where output 352 is less than output 366. In contrast, the value of SEL output 382 is asserted to eliminate the used of pre-coding where output 352 is greater than or equal to output 366. Once standard operation is again selected, the values written to programmable pre-coder/non-pre-coder zone selector register 380 are used to control whether pre-coding or non-precoding is employed.

Figure 4:
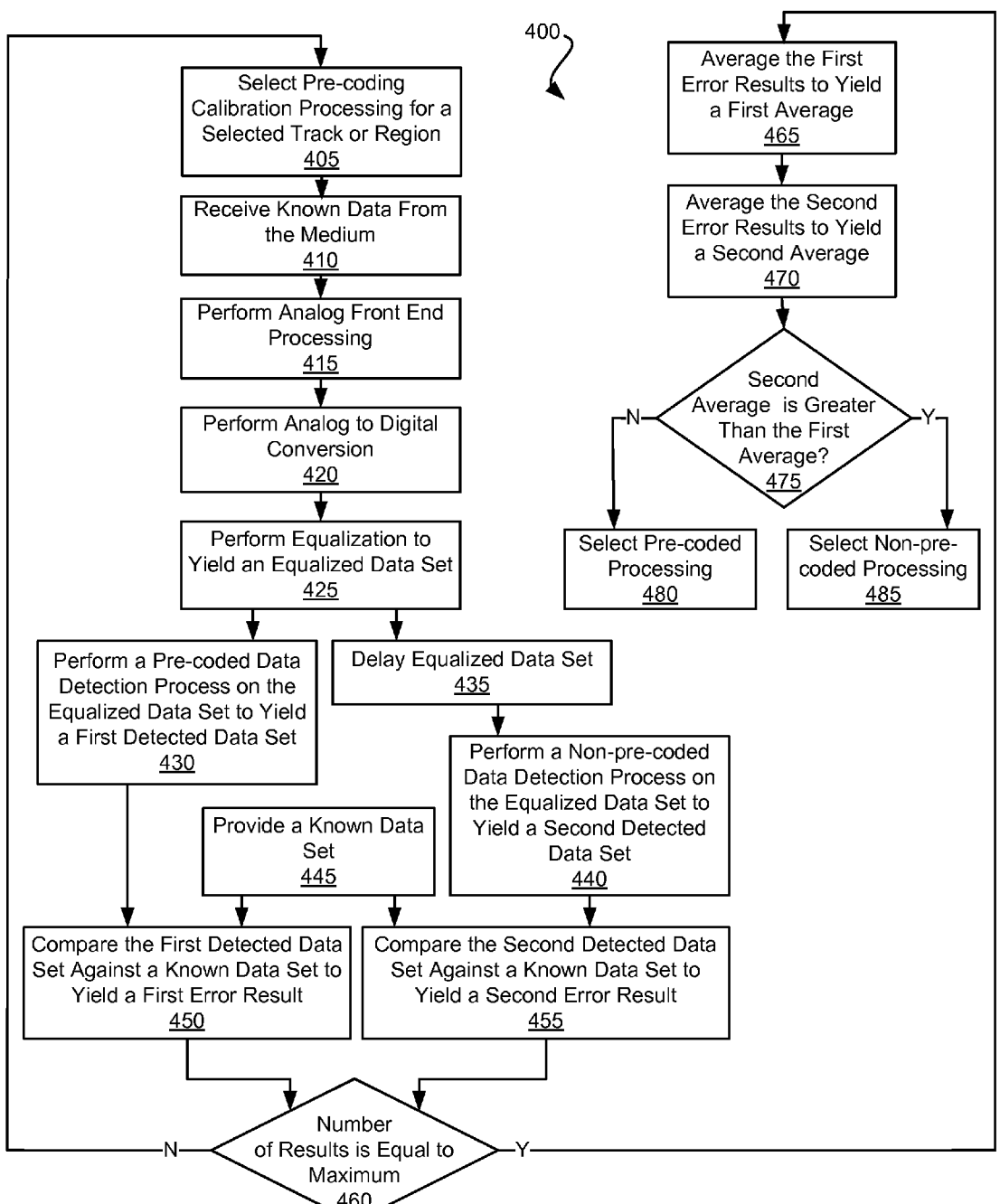
FIG. 4 is a flow diagram showing a method for pre-code selection in a data processing circuit in accordance with some embodiments of the present invention.

Turning to FIG. 4, a flow diagram 400 shows a method for pre-code selection in a data processing circuit in accordance with some embodiments of the present invention. Following flow diagram 400, pre-coding calibration processing is selected for a given region or zone (block 405). Selection of such pre-coding calibration process may be done, for example, by asserting CAL input 389 to cause logic '0' data set 386 to be provided as output 388 from multiplexer 385 to data detector circuit 360. In addition, programmable pre-coder/non-pre-coder zone selector register 380 causes selector input 383 to be asserted such that data detector circuit 345 is configured to compensate for pre-coding (e.g., apply (1⊕D)) and to assert selector input 384 to such that data detector circuit 360 is configured to perform data detection without compensating from pre-coding. A known data set is read from the particular region or zone of the storage medium (block 410). This may be done, for example, by positioning a read/write head assembly over the storage medium and sensing the data from that particular region or storage medium. The sensed data is provided to an analog circuit where analog front end processing is performed on the data to yield an analog processed output (block 415). This processing may include, for example, amplifying the sensed data and performing an analog filtering on the amplified output to yield the analog processed output. The analog processed output is converted to a series of digital samples using an analog to digital converter circuit (block 420). This may be done using any analog to digital conversion process known in the art.

An equalization process is applied to the series of digital samples to yield an equalized data set (block 425). In some cases, the equalization is performed using a digital finite impulse response filter as are known in the art. A pre-code compensating data detection process is performed on the equalized data set to yield a first detected data set (block 430). The data detection process may be any data detection process known in the art such as, for example, a Viterbi algorithm data detection process or a maximum a posteriori data detection process. The data detection process is augmented to compensate for pre-coding (e.g., to apply a (1⊕D) function to the received equalized data set prior to performing the data detection process). In addition, the equalized data set is delayed (block 435) and a non-pre-code compensating data detection process is performed on the equalized data set to yield a second detected data set (block 440). The data detection algorithm may be the same as that applied in block 430.

A comparison copy of the same data set originally written from the storage medium is provided as a known data set (block 445). This may be provided, for example, from a buffer in which the data is stored. The known data set is compared against the first detected data set to yield a first error result (block 450), and against the second detected data set to yield a second error result (block 455). It is then determined whether the number of error results corresponds to that desired (block 460). A number of error results are averaged together to mitigate any noise. In some cases, the number of error results utilized is programmable. The number error results may correspond, for example, to several thousand bits retrieved from the storage medium. Based upon the disclosure provided herein, one of ordinary skill in the art will recognize different numbers of error results that may be used.

Where the number of error results is less than a maximum or desired number of results (block 460), the processes of blocks 405 through 455 are repeated. Otherwise, where the number of results is equal to the maximum or desired number of results (block 460), all of the first error results are averaged together to yield a first average (block 465) and all of the second error results are averaged together to yield a second average (block 470). It is then determined whether the second average is greater than the first average (block 475). Where the second average is greater than the first average (block 475), non-pre-coded processing is selected (block 485). Such non-pre-coded processing is selected by, for example, writing a value corresponding to the selection to programmable pre-coder/non-pre-coder zone selector register 380. When this region of the storage device is read during standard operating mode, the written value causes data detector circuit 345 to be operated such that it does not compensate for pre-coding. Alternatively, where the second average is not greater than the first average (block 475), pre-coded processing is selected (block 480). Such pre-coded processing is selected by, for example, writing a value corresponding to the selection to programmable pre-coder/non-pre-coder zone selector register 380. When this region of the storage device is read during standard operating mode, the written value causes data detector circuit 345 to be operated such that it compensates for pre-coding.

Figure 5:
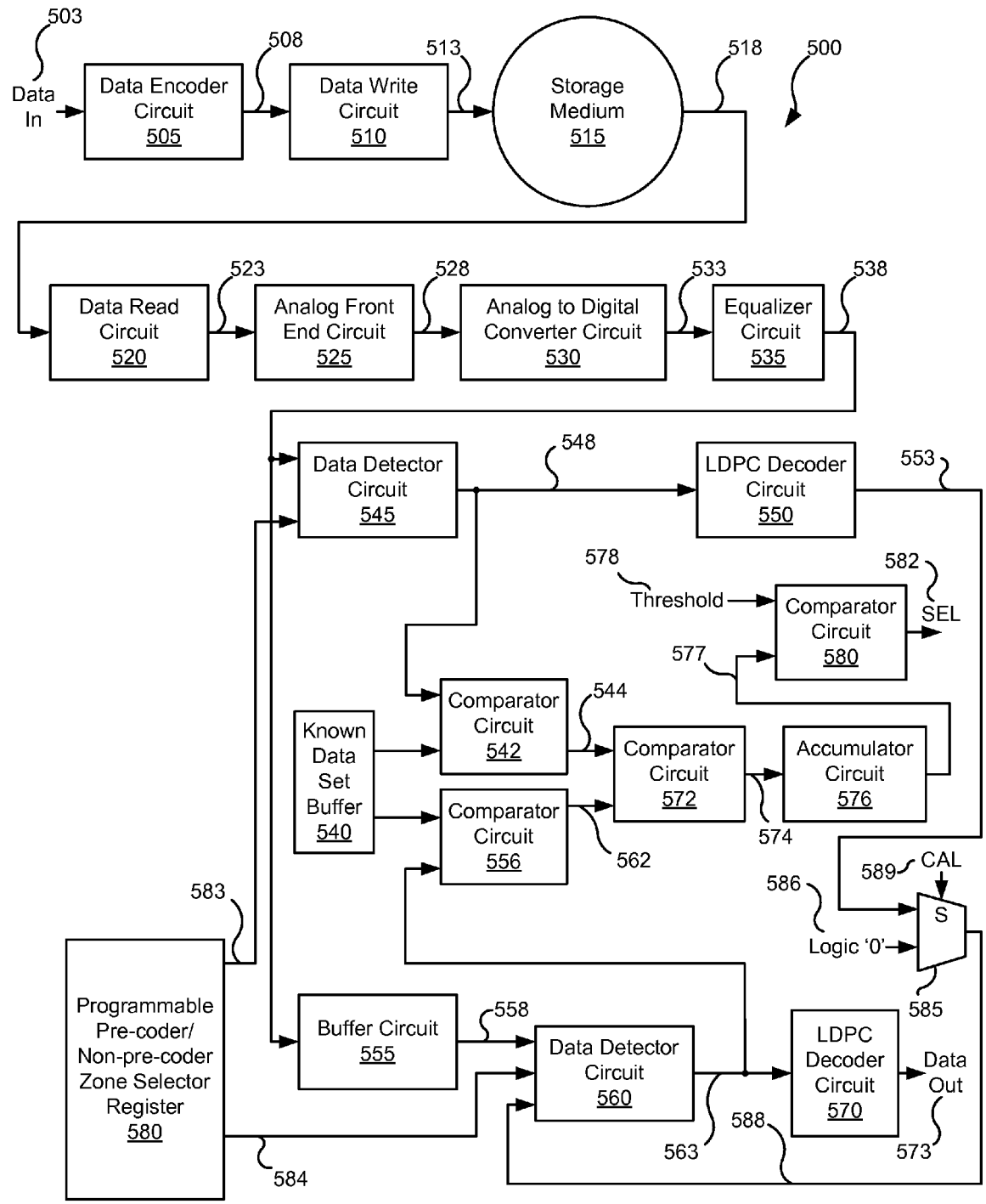
FIG. 5 depicts another pre-code selectable data processing circuit in accordance with other embodiments of the present invention.

Turning to FIG. 5, a pre-code selectable data processing circuit 500 is shown in accordance with various embodiments of the present invention. In contrast to pre-code selectable data processing circuit 300 discussed above in relation to FIG. 3, pre-code selectable data processing circuit 500 does not utilize a separate counter circuit to cause a write of the calibration results to a register. Rather, the result free floats being re-written to the register on every cycle and is effectively stored only when the next register corresponding to another zone is selected for writing.

Pre-code selectable data processing circuit 500 may be configured to operate in a calibration mode or a standard mode based upon an assertion level of a CAL input 589 to a selector input 585. When CAL input 589 is asserted to select a calibration mode, a logic '0' data set 586 is provided as an output 588 from multiplexer 588. In such a situation, a data detector circuit 560 operates on a received data set independent of a data detector circuit 545. In contrast, when CAL input 589 is asserted to select a standard mode, a decoded output 553 is provided as an output 588 from multiplexer 585. In such a situation, data detector circuit 560 operates on data derived from an output of data detector circuit 545.

Pre-code selectable data processing circuit 500 includes a data encoder circuit 505 that encodes a data input 503 and provides an encoded output 508. Data encoder circuit 505 may be any circuit known in the art that is capable of encoding a received data set. In some embodiments of the present invention, data encoder circuit 505 is a low density parity check circuit as are known in the art. Based upon the disclosure provided herein, one of ordinary skill in the art will recognize a variety of encoder circuits that may be used in relation to different embodiments of the present invention. Encoded output 508 is provided to a data write circuit 510. In some cases, data write circuit 510 selectably applies pre-coding to the data (e.g., apply 1/(1⊕D)). Data write circuit 510 may be any circuit known in the art that is capable of converting a data set to information that may be maintained on a storage medium 515. Based upon the disclosure provided herein, one of ordinary skill in the art will recognize a variety of data write circuits that may be used in relation to different embodiments of the present invention. In some embodiments of the present invention, storage medium 515 is a magnetic storage medium.

A data read circuit 520 senses information from storage medium 515, and provides a corresponding electrical signal 523 to an analog front end circuit 525. Data read circuit 520 may be any circuit known in the art that is capable of sensing information from storage medium 515. This circuit may include, for example, a read/write head assembly as are known in the art. Based upon the disclosure provided herein, one of ordinary skill in the art will recognize a variety of data read circuits that may be used in relation to different embodiments of the present invention.

Electrical signal 523 is processed by analog front end circuit 525 to yield a modified signal 528. Analog front end circuit 525 may be any analog processing circuit known in the art. In one particular embodiment of the present invention, analog front end circuit 525 includes an amplifier circuit and a continuous time filter (i.e., an analog filter) that operate to amplify and noise filter the received input to yield modified signal 528. An analog to digital converter circuit 530 converts modified signal 528 into a series of digital samples 533. Analog to digital converter circuit 530 may be any circuit known in the art that is capable of providing a series of digital samples that correspond to a received analog input. Digital samples 533 are provided to an equalizer circuit 535 that yields a corresponding equalized output 538.

Equalized output 538 is provided to a data detector circuit 545 and a buffer circuit 555. Data detector circuit 545 applies a data detection algorithm to equalized output 538 to yield a detected output 548 to a data decoder circuit 550. Data detector circuit 545 may apply any data detection algorithm known in the art. In one particular embodiment of the present invention, data detector circuit 545 is a Viterbi algorithm data detector circuit as are known in the art. In another embodiment of the present invention, data detector circuit 545 is a maximum a posteriori data detector circuit as are known in the art. Based upon the disclosure provided herein, one of ordinary skill in the art will recognize other data detector circuits that may be used in relation to different embodiments of the present invention.

Data decoder circuit 550 applies a decoder algorithm to detected output 548 to yield decoded output 553. In some embodiments of the present invention, data decoder circuit 550 is a low density parity check decoder circuit as are known in the art. Based upon the disclosure provided herein, one of ordinary skill in the art will recognize various decoder circuits that may be used in relation to different embodiments of the present invention.

A buffered data set 558 is provided from buffer circuit 555 to a data detector circuit 560. Buffered data set 558 is equalized output 538 delayed in time by passing through buffer circuit 555. Data detector circuit 560 applies a data detection algorithm to buffered data set 558 to yield a detected output 563 to a data decoder circuit 570. Data detector circuit 560 may apply any data detection algorithm known in the art. In one particular embodiment of the present invention, data detector circuit 560 is a Viterbi algorithm data detector circuit as are known in the art. In another embodiment of the present invention, data detector circuit 560 is a maximum a posteriori data detector circuit as are known in the art. Based upon the disclosure provided herein, one of ordinary skill in the art will recognize other data detector circuits that may be used in relation to different embodiments of the present invention.

Data decoder circuit 570 applies a decoder algorithm to detected output 563 to yield decoded output 573. In some embodiments of the present invention, data decoder circuit 570 is a low density parity check decoder circuit as are known in the art. Based upon the disclosure provided herein, one of ordinary skill in the art will recognize various decoder circuits that may be used in relation to different embodiments of the present invention.

Data detector circuit 545 may be configured to compensate for pre-coding (e.g., apply (1⊕D)), or to operate as if pre-coding was not applied depending upon an assertion level of a selector input 583. Selector input 583 may be programmed by writing to a programmable pre-coder/non-pre-coder zone selector register 580, and is selectable from one region to another region on storage medium 515. Providing for selection of pre-coding/non-pre-coding on a zone by zone basis allows for using pre-coding where it provides an advantage, and does not require pre-coding during other regions. Programmable pre-coder/non-pre-coder zone selector register 580 is written using a value of a SEL output 582 generated during a calibration phase. SEL output 582 is continuously written to a selected address in programmable pre-coder/non-pre-coder zone selector register 580. Due to noise, SEL output 582 may be dynamic over initial phases of a calibration, but typically stabilizes over time. The address to which SEL 582 is written is changed during a period when SEL output 582 is stable and representative of the error results detected during a particular region or zone of storage medium 515 to which the selection is relevant. Once the address is changed, the values driving SEL output 582 are reset and data from a subsequent region or zone of storage medium 515 is used to generate a subsequent value for SEL output 582.

Similarly, data detector circuit 560 may be configured to compensate for pre-coding (e.g., apply (1⊕D)), or to operate as if pre-coding was not applied depending upon an assertion level of a selector input 584. Selector input 584 may also be programmed by writing to programmable pre-coder/non-pre-coder zone selector register 580, and is selectable from one region to another region on storage medium 515. Providing for selection of pre-coding/non-pre-coding on a zone by zone basis allows for using pre-coding where it provides an advantage, and does not require pre-coding during other regions. Programmable pre-coder/non-pre-coder zone selector register 580 is written using a value of a SEL output 582 generated during a calibration phase. During standard operation of pre-code selectable data processing circuit 500, selector input 583 and selector input 584 are the same values drawn from the same programmed value. During calibration operation of pre-code selectable data processing circuit 500, selector input 583 operates to configure data detector circuit 545 is a pre-code mode and selector input 584 operates to configure data detector circuit 560 in a non-pre-code mode. In this way, a comparison between operation using pre-coding and another operation without pre-coding may be done.

When in the standard operational mode, CAL input 589 is asserted to select decoded output 553 that is provided as an output 588 to data detector circuit 560. In this situation, data detector circuit 560 uses the soft output portion of decoded output 553 to guide the data detection on equalized output 538 delayed and provided as buffered data set 558. In this mode, the result of output SEL 582 is not utilized.

When in the calibration mode, CAL input 589 is asserted to select the logic '0' input 586 that is provided as output 588 to data detector circuit 560. In this situation, both data detector circuit 545 and data detector circuit 360 operate on equalized output 538 in effect independently as the soft data from decoded output 553 is not made available to data detector circuit 560. In this mode of operation, selector input 583 is asserted to cause data detector circuit 545 to account for pre-coding and selector input 584 is asserted to cause data detector circuit 360 to operate without accounting for pre-coding. SEL output 582 is written back to programmable pre-coder/non-pre-coder zone selector register 580 at an address corresponding to the zone or region from which the data set used to generate equalized data 538 is being derived. The value of SEL 582 written to programmable pre-coder/non-pre-coder zone selector register 580 is used to select either pre-coding or non-pre-coding for the given zone during standard operation.

Detected output 548 is provided to a comparator circuit 542 where it is compared with a known data from a known data set buffer 540. The known data set is the same data set that was written to storage medium 515. In the calibration mode, the known data set is read from storage medium to yield equalizer output 538, and pulled from known data set buffer 540. Comparator circuit 542 yields an error output 544 which is a bit by bit error value indicating a difference between detected output 548 provided using data detector circuit 545 applying a pre-coding compensation. Similarly, detected output 563 is provided to a comparator circuit 556 where it is compared with the same known data from known data set buffer 540. Comparator circuit 556 yields an error output 562 which is a bit by bit error value indicating a difference between detected output 563 provided using data detector circuit 560 that is not configured to apply pre-coding compensation.

Error output 544 and error output 562 are provide to a comparator circuit 572 that provides a comparison output 574 indicating which of error output 544 or error output 562 are the largest. In particular, where error output 544 is greater than error output 562 (meaning an error was detected in detected output 548 and not in detected output 563, comparison output 574 is asserted high. Otherwise, comparison output 574 is asserted low. Accumulator circuit 576 adds the value of comparison output 574 over a number of bit periods to yield an accumulated output 577. Where the number of errors detected in detected output 548 is substantially larger than those detected in detected output 563, accumulated output 577 will become greater than a programmable threshold value 578, and a comparator circuit 580 will assert SEL output 582 to indicate that non-pre-coding (i.e., the processing applied by detector circuit 560) should be applied. Otherwise, SEL output 582 is asserted to indicate that pre-coding (i.e., the processing applied by detector circuit 545) should be applied. As mentioned before, the selection value of SEL output 582 is written to a location in programmable pre-coder/non-pre-coder zone selector register 580 corresponding to the region or zone on storage medium 515 from which the data used to derive equalized output 538 is read.

Figure 6:
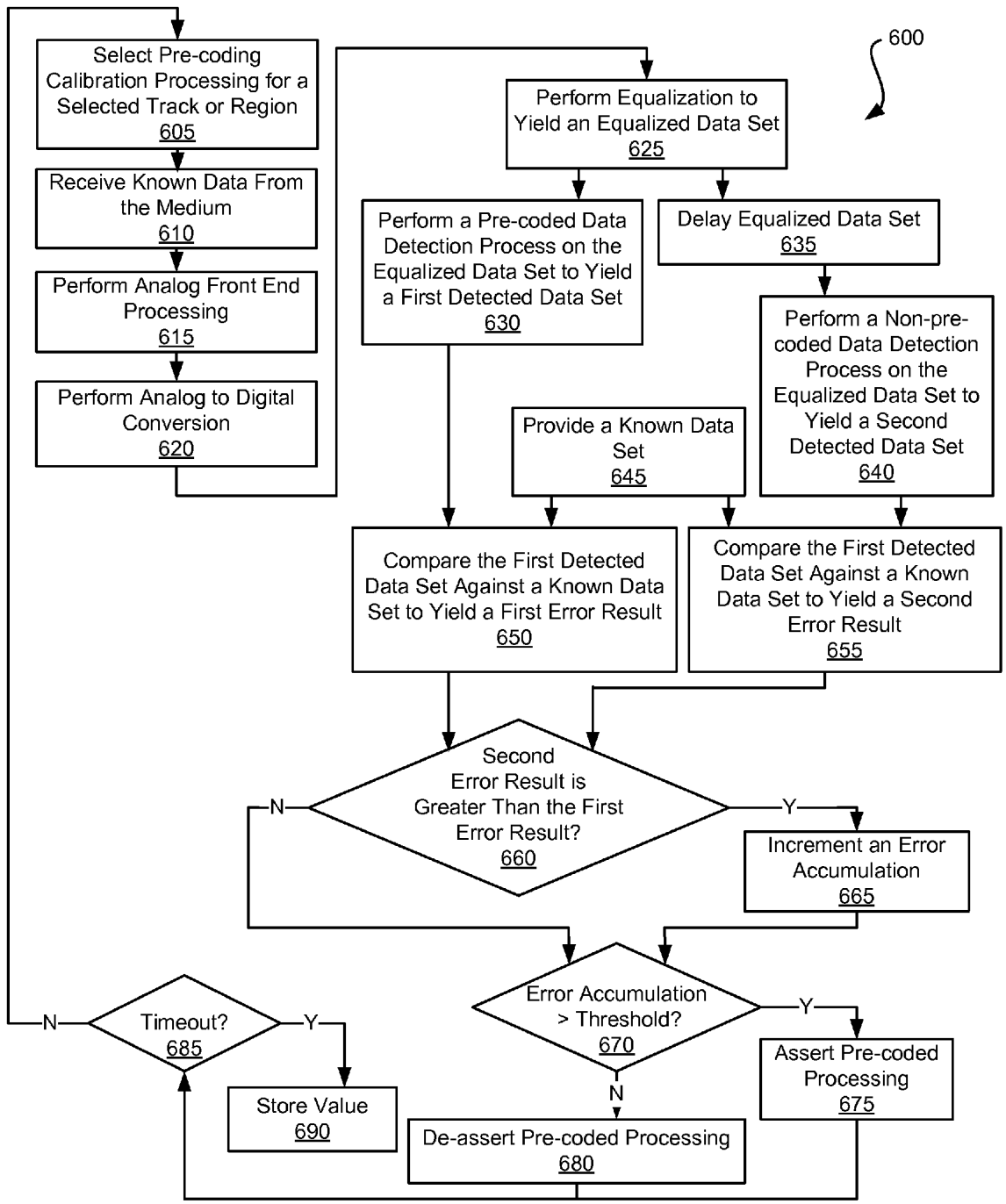
FIG. 6 is a flow diagram showing another method for pre-code selection in a data processing circuit in accordance with some embodiments of the present invention.

Turning to FIG. 6, a flow diagram 600 depicts another method for pre-code selection in a data processing circuit in accordance with some embodiments of the invention. Following flow diagram 600, pre-coding calibration processing is selected for a given region or zone (block 605). Selection of such pre-coding calibration process may be done, for example, by asserting CAL input 589 to cause logic '0' data set 586 to be provided as output 588 from multiplexer 585 to data detector circuit 560. In addition, programmable pre-coder/non-pre-coder zone selector register 580 causes selector input 583 to be asserted such that data detector circuit 545 is configured to compensate for pre-coding (e.g., apply (1⊕D)) and to assert selector input 584 to such that data detector circuit 560 is configured to perform data detection without compensating from pre-coding. A known data set is read from the particular region or zone of the storage medium (block 610). This may be done, for example, by positioning a read/write head assembly over the storage medium and sensing the data from that particular region or storage medium. The sensed data is provided to an analog circuit where analog front end processing is performed on the data to yield an analog processed output (block 615). This processing may include, for example, amplifying the sensed data and performing an analog filtering on the amplified output to yield the analog processed output. The analog processed output is converted to a series of digital samples using an analog to digital converter circuit (block 620). This may be done using any analog to digital conversion process known in the art.

An equalization process is applied to the series of digital samples to yield an equalized data set (block 625). In some cases, the equalization is performed using a digital finite impulse response filter as are known in the art. A pre-code compensating data detection process is performed on the equalized data set to yield a first detected data set (block 630). The data detection process may be any data detection process known in the art such as, for example, a Viterbi algorithm data detection process or a maximum a posteriori data detection process. The data detection process is augmented to compensate for pre-coding (e.g., to apply a (1⊕D) function to the received equalized data set prior to performing the data detection process). In addition, the equalized data set is delayed (block 635) and a non-pre-code compensating data detection process is performed on the equalized data set to yield a second detected data set (block 640). The data detection algorithm may be the same as that applied in block 630.

A comparison copy of the same data set originally written from the storage medium is provided as a known data set (block 645). This may be provided, for example, from a buffer in which the data is stored. The known data set is compared against the first detected data set to yield a first error result (block 650), and against the second detected data set to yield a second error result (block 655). It is then determined whether the second error result is greater than the first error result (block 660). Where the second error result is greater than the first error result (block 660), an error accumulation is incremented (block 665). Otherwise, the error accumulation is not incremented. It is then determined whether the error accumulation is greater than a threshold value (block 670). Where the accumulation is greater than the threshold, pre-coded processing is asserted (i.e., an output is set to a value corresponding to selection of pre-coded processing) (block 675). Otherwise, where the accumulation is not greater than the threshold, non-pre-coded processing is asserted (i.e., an output is set to a value corresponding to selection of pre-coded processing) (block 680). In some cases, the threshold value is programmable. It is then determined whether sufficient data has been processed (i.e., a timeout condition occurs) (block 685). Where a timeout has not yet occurred (block 685), the process is continued for additional data. Otherwise, where a timeout has occurred (block 685), the value represented by the most recent assertion of the result value (block 675, 680) is stored (block 690) to programmable pre-coder/non-pre-coder zone selector register 580. When a corresponding region or zone of the storage medium is read during standard operating mode, the written value causes data detector circuit 545 to be selectably operated such that it compensates for pre-coding or does not compensate for pre-coding.

It should be noted that the various blocks discussed in the above application may be implemented in integrated circuits along with other functionality. Such integrated circuits may include all of the functions of a given block, system or circuit, or only a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit. It should also be noted that various functions of the blocks, systems or circuits discussed herein may be implemented in either software or firmware. In some such cases, the entire system, block or circuit may be implemented using its software or firmware equivalent. In other cases, the one part of a given system, block or circuit may be implemented in software or firmware, while other parts are implemented in hardware.

In conclusion, the invention provides novel systems, devices, methods and arrangements for data processing. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A data processing circuit, the circuit comprising:
a first data detector circuit selectably configurable to operate in a pre-coded state, and operable to apply a data detection algorithm on a data input to yield a first detected output;
a second data detector circuit operable to apply the data detection algorithm to the data input to yield a second detected output without compensating for pre-coding;
a first comparator circuit operable to compare the first detected output against a known input to yield a first comparison value;
a second comparator circuit operable to compare the second detected output against the known input to yield a second comparison value; and
a pre-code selection circuit, wherein the pre-code selection circuit is operable to determine a selectable configuration of the first data detector circuit based at least in part on the first comparison value and the second comparison value.

2. The circuit of claim 1, wherein the first data detector circuit is configurable to operate in a state selected from a group consisting of: the pre-coded state and a non-pre-coded state.

3. The circuit of claim 2, wherein the pre-coded state includes compensating for pre-coding in addition to applying the data detection algorithm.

4. The circuit of claim 3, wherein compensating for pre-coding includes applying a (1⊕D) function to the data input.

5. The circuit of claim 2, wherein the non-pre-coded state includes applying the data detection algorithm without compensating for pre-coding.

6. The circuit of claim 1, wherein the circuit further comprises:
a data decoder circuit operable to apply a decoding algorithm to the first detected output to yield a decoded output; and
a selector circuit operable to select application of the decoded output to the second data detector circuit, wherein the decoded output guides the data detection algorithm applied by the second data detector circuit.

7. The circuit of claim 6, wherein:
the first data detector circuit is selected from a group consisting of: a Viterbi algorithm data detector circuit and a maximum a posteriori data detector circuit;
the second data detector circuit is selected from a group consisting of: a Viterbi algorithm data detector circuit and a maximum a posteriori data detector circuit; and
the data decoder circuit if a low density parity check decoder circuit.

8. The circuit of claim 1, wherein the circuit is implemented as part of an integrated circuit.

9. The circuit of claim 1, wherein the circuit is implemented in a read channel of a hard disk drive.

10. The circuit of claim 1, wherein the pre-code selection circuit comprises:
a third comparator circuit operable to compare the first comparison value with the second comparison value to yield a difference output;
an accumulator circuit operable to increment an accumulated output each time the first comparison value is greater than the second comparison value; and
a fourth comparator circuit operable to compare the accumulated output with a threshold value to yield a value indicating the selectable configuration.

11. The circuit of claim 1, wherein the pre-code selection circuit comprises:
a first accumulator circuit operable to increment a first accumulated output each time the first comparison value indicates that the first detected output is different from the known data set;
a second accumulator circuit operable to increment a second accumulated output each time the second comparison value indicates that the second detected output is different from the known data set; and
a third comparator circuit operable to compare the first accumulated output with the second accumulated output to yield a value indicating the selectable configuration.

12. A method for calibrating a data processing circuit, the method comprising:
providing a first data detector circuit;
providing a second data detector circuit;
configuring the first data detector circuit to perform a data detection algorithm including pre-coded compensation on a received data set to yield a first detected output;
configuring the second data detector circuit to perform the data detection algorithm without pre-coded compensation on a received data set to yield a second detected output; and
selecting between a pre-coded state and a non-pre-coded state based at least in part on the first detected output and the second detected output.

13. The method of claim 12, wherein:
the first data detector circuit is selected from a group consisting of: a Viterbi algorithm data detector circuit and a maximum a posteriori data detector circuit; and
the second data detector circuit is selected from a group consisting of: a Viterbi algorithm data detector circuit and a maximum a posteriori data detector circuit.

14. The method of claim 12, wherein selecting between the pre-coded state and a non-pre-coded state comprises:
comparing the first detected output with a known data set to yield a first comparison value;
comparing the second detected output with the known data set to yield a second comparison value; and
wherein selecting between a pre-coded state and a non-pre-coded state is based at least in part on the first comparison value and the second comparison value.

15. The method of claim 14, wherein selecting between the pre-coded state and a non-pre-coded state further comprises:
averaging a plurality of first comparison values to yield a first average value;
averaging a plurality of second comparison values to yield second average value; and
comparing the first average with the second average to yield an indication of the pre-coded state and the non-pre-coded state.

16. The method of claim 15, wherein the pre-coded state includes applying a (1⊕D) function to the received data set prior to applying the data detection algorithm.

17. The method of claim 14, wherein selecting between the pre-coded state and a non-pre-coded state further comprises:
incrementing a first accumulated value each time the first comparison value indicates that the first detected output is different from the known data set;
incrementing a second accumulated value each time the second comparison value indicates that the second detected output is different from the known data set; and
comparing the first accumulated value with the second accumulated value to yield indication of the pre-coded state and the non-pre-coded state.

18. The method of claim 17, wherein the pre-coded state includes applying a (1⊕D) function to the received data set prior to applying the data detection algorithm.

19. A data storage device, the storage device comprising:
a storage medium maintaining information;
a sensor device disposed in relation to the storage medium and operable to sense the information and to provide a corresponding analog signal;
an analog to digital converter circuit operable to convert a derivative of the analog signal to a series of digital samples;
an equalizer circuit operable to perform an equalization on the series of digital samples to yield an equalized output;
a data processing circuit including:
a first data detector circuit selectably configurable to operate in a pre-coded state, and operable to apply a data detection algorithm on the equalized output to yield a first detected output;
a second data detector circuit operable to apply the data detection algorithm to the equalized output to yield a second detected output without compensating for pre-coding;
a first comparator circuit operable to compare the first detected output against a known input to yield a first comparison value;
a second comparator circuit operable to compare the second detected output against the known input to yield a second comparison value; and
a pre-code selection circuit, wherein the pre-code selection circuit is operable to determine a selectable configuration of the first data detector circuit based at least in part on the first comparison value and the second comparison value.

20. The storage device of claim 19, wherein the data processing device further comprises:
a third comparator circuit operable to compare the first comparison value with the second comparison value to yield a difference output;
an accumulator circuit operable to increment an accumulated output each time the first comparison value is greater than the second comparison value; and
a fourth comparator circuit operable to compare the accumulated output with a threshold value to yield a value indicating the selectable configuration.

21. The storage device of claim 19, wherein the data processing device further comprises:
a first accumulator circuit operable to increment a first accumulated output each time the first comparison value indicates that the first detected output is different from the known data set;
a second accumulator circuit operable to increment a second accumulated output each time the second comparison value indicates that the second detected output is different from the known data set; and a third comparator circuit operable to compare the first accumulated output with the second accumulated output to yield a value indicating the selectable configuration.

* * * * *